United States Patent [19]

Heuling

[11] Patent Number: 5,009,061
[45] Date of Patent: Apr. 23, 1991

[54] PROCESS AND APPARATUS FOR HARVESTING OF CROPS FROM STALKS AND CHOPPING THE STALKS

[76] Inventor: Ulrich S. Heuling, Tillmannstrasse 5, D-4410 Warendorf, Fed. Rep. of Germany

[21] Appl. No.: 438,042

[22] Filed: Nov. 20, 1989

[51] Int. Cl.⁵ ............................................. A01D 45/02
[52] U.S. Cl. .......................................... 56/104; 56/105
[58] Field of Search ................. 56/104, 105, 106, 107, 56/94

[56] References Cited

U.S. PATENT DOCUMENTS

| | | | |
|---|---|---|---|
| 1,764,686 | 6/1930 | Kuhlman | 56/104 X |
| 1,938,954 | 12/1933 | Coultas | 56/104 |
| 2,604,750 | 7/1952 | Fergason | 56/104 |
| 3,174,484 | 3/1965 | Anderson | 56/104 X |
| 3,462,928 | 8/1969 | Schreiner et al. | 56/104 |

FOREIGN PATENT DOCUMENTS

| | | |
|---|---|---|
| 6751770 | 1/1969 | Fed. Rep. of Germany . |
| 1757213 | 2/1970 | Fed. Rep. of Germany . |
| 1948511 | 4/1971 | Fed. Rep. of Germany . |
| 2005352 | 6/1971 | Fed. Rep. of Germany . |
| 7909446 | 7/1979 | Fed. Rep. of Germany . |
| 3013689 | 10/1980 | Fed. Rep. of Germany . |
| 3213542 | 10/1983 | Fed. Rep. of Germany . |
| 1268615 | 1/1963 | France . |

*Primary Examiner*—Stephen J. Novosad
*Attorney, Agent, or Firm*—Burns, Doane, Swecker & Mathis

[57] ABSTRACT

A harvester attachment for stripping crop clusters from tall stalks such as corn includes an intake path into which the stalks are received. The stalks are pulled through a narrow gap disposed in the intake path to strip-off the crop clusters. A pair of rotary bladed members are arranged on opposite sides of the intake path beneath the narrow gap. Opposing blades on the rotating bladed members radially overlap as they rotate to engage and fracture the stalks. The tip speed of the blades on one of the bladed members is greater than the tip speed of the other bladed member to enable the stalks to be severed by the blades.

23 Claims, 7 Drawing Sheets

PROCESS AND APPARATUS FOR HARVESTING OF CROPS FROM STALKS AND CHOPPING THE STALKS

BACKGROUND OF THE INVENTION

The invention concerns a process and apparatus for the harvesting of crop clusters of tall growing plants, for example corn and sunflowers, whereby the crop cluster or clusters grown on a stalk are separated from the stalk and collected, and thereafter the stalk is chopped up.

To harvest the crop clusters of tall growing plants, such as corn and sunflowers, the clusters have heretofore been separated by gripping the stalk with an intake roll and drawing the stalk through a gathering gap, the width of which is narrower than the diameter of the cluster, so that the cluster is torn off in the course of being drawn in. The crop cluster picked off in this manner is transported by a conveyor to a collector container of the harvester, by means of a chain, a belt or screw conveyor.

For the harvesting of crops of this type, existing agricultural harvesting machines are retro-fitted by the attachment of suitable gathering heads, which for example are driven directly or indirectly by a power take-off shaft. It is known to equip harvesting machines with attachments for crop clusters of this type, in particular for corn, wherein the harvesting machine is provided originally with a transverse drive shaft, that may be equipped with suitable driving means for harvesting attachments to be added. It is possible in this manner to render agricultural machines or harvesters capable of gathering corn in time for the corn harvest. These harvesting attachments grip the corn stalk very deep and draw it through an intake path, with the driven intake rolls being preceded by the intake gap.

German Patent No. 17 57 313 describes a harvesting attachment of this type, comprising intake rolls located on either side of the intake path and driven in opposing directions and a gathering gap through which the plant stalk is being drawn during harvesting. The crop clusters are unable to pass through the gathering gap, so they are torn from the stalk and taken over by a conveyor. The intake rolls are provided with projecting ribs which engage each other during rotation. In the intake area, the plant stalk gripped in this manner is fractured without actually being separated at this fracture location. This fracturing is restricted to the comminution of woody stalk material within the action range of the ribs, wherein continuous fibers (similar to flax breaking) remain preserved.

In order to safely grip the stalk of the plant and draw it through the gathering gap, various suggestions have been presented relative to the configuration of the intake rolls. According to German Patent No. 30 13 689, the rolls have a "star-shaped cross section", with the hollow grooves of one intake roll engaging the projecting ribs of the other intake roll.

According to U.S. Pat. Nos. 3,462,928 and No. 3,174,484, angled sections with pins are set on a shaft with a polygonal, preferably rectangular crosssection, which sections form a similar star-shape and cooperate with each other as in the above-described manner.

Another development is described in U.S. Pat. No. 2,604,750 wherein the ribs are in the form of cutting edges cooperating with an essentially cylindrical counter roll.

To improve the uptake of plants for example lying on the ground, it is proposed in German Patent No. 19 48 511 to rotate helix-equipped noses of the intake rolls at a different (higher) rpm, the intake parts gripping the stalk. For this purpose, the drive shaft of the intake part is in the form of a hollow shaft, through which extends the drive shaft for the nose of the intake roll.

In order to grip stalks of significantly different thicknesses, it is proposed in French Patent No. 1,268,615 to drive at least one of the intake rolls by means of a ball-and-socket joint, so that both of the intake rolls are located at a variable angle to each other and are spaced apart in the area of the nose of the intake roll at a distance corresponding to the stalk diameter.

In all cases, the intake rolls are rotating in opposite directions synchronously at the same rpm, to assure the cooperation of the rolls. A disadvantage here involves the fact that the stalk of the plant is broken but not chopped up or comminuted. To attain the necessary comminution of the stalks, a separate chopper is required, for example according to German Documents GM 67 51 770, GM 79 09 446 or AS 20 05 352.

German Patent 32 13 542 describes a harvester attachment, whereby the stalks are to be cut during their intake movement. For that purpose, a single intake roll is provided for each gathering gap, with the necessary support provided by a partial shrouding surrounding the intake roll. This partial shrouding is additionally equipped with blades pointing in the direction of the intake roll, with the ribs set onto the intake roll having recesses, so that the meshing of the blades in the ribs becomes possible. Aside from problems arising due to the asymmetry of the entry of the plant stalk into the partially shrouded area, squeezing between the ribs and the partial shroud occurs essentially for drawing in the stalk. The blades become effective to cut the stalk only if the stalk is drawn in a relatively pronounced oblique position relative to the intake roll. The squeezing itself only weakens the stalk without cutting the individual stalk sections, with the squeezing process requiring the application of considerable power by the intake roll.

It is, therefore, an object of the present invention to provide a process and apparatus whereby the above-discussed disadvantages are eliminated, and the separation of the individual sections of the plant stalks produced by the breaking or buckling of the stalk after the crop cluster is picked off, is necessarily obtained. A further object is to perform such a process by a modular attachment for harvesting machines, with the process being economical by reducing power requirements and the modular attachment having a simple and easily maintained configuration.

SUMMARY OF THE INVENTION

The present invention involves a process and apparatus for harvesting crop clusters of tall plant stalks wherein tall stalks are introduced into a longitudinally extending intake path and are pulled through a gathering gap disposed in the intake path to strip the crop clusters from the stalks. A pair of bladed rotary members is provided, the members having longitudinally extending axes disposed along opposing sides of the gathering gap. The members are rotated in opposite directions such that opposing blades of the members define a stalk contact zone having an inlet situated proximate the gathering gap and an outlet situated remote from the gathering gap. The opposing blades have different tip speeds, whereby stalks are fractured and severed by the opposing blades.

Due to the use of intake rolls with shearing blades whose outer tips of the shearing blades have different tip speeds in the intake path, the stalks gripped by the relatively traveling blades are torn apart. The circular moving paths of the shearing blades can be located so that they are in contact, but preferably are radial overlapping. In order to obtain the cooperation of the shearing blades relative to the breaking and separation of the stalks, it is necessary to equalize the rotating motion, wherein the intake roll rotating at a higher tip speed is driven at a higher rpm and has the same diameter as the roll and further has fewer shearing blades than the slower roll. These fewer shearing blades are set so that with each passage of a shearing blade of the slower intake roll a passage of a shearing blade of the faster rotating intake roll is coordinated.

Another way to attain this result is to rely upon the fact that the peripheral speed of a rotary blade equals the angular velocity (rpm) multiplied by the radius. Thus, one of the rolls can be given a larger diameter and the same rpm as the other roll; the blades of the larger roll will have a faster peripheral velocity.

The two intake rolls may be equipped with the same number of shearing blades. The rotating motion must be synchronized in both of the above cases so that immediately prior to the contact or overlapping, the faster shearing blade has passed the slower one and precedes it in the area of the salk discharge. In this manner in the inlet area the stalk is broken and the fracture location of the stalk is sheared through by the precision of the faster shearing blade in the course of the inlet motion. The breaking of the stalk prior to shearing reduces the force required to cut the stalk, as the "breaking work" already applied correspondingly reduces the "shear work" required for comminution. This reduction of the force requirements further leads to a reduction of the overall power needs of the harvesting attachment, which in a final analysis affects the motor power needs of the harvesting attachment, which in a final analysis to be installed or the number of attachments possible with a given motor capacity and also makes possible simpler configurations of the drive elements.

It is advantageous further if the rpm ratio of the two intake rolls is an integer number, for example 1:2. This signifies that the faster intake roll has N times the rotating velocity relative to the slower intake roll, preferably twice that velocity, and that the number of its shear blades is 1/N times (preferably ½ times) of that of the slower roll. Simple non-integer ratios, for example 4:6 are also possible; it is merely essential that in the area of the intake path the movements of the shear blades necessarily are related to each other, as described above. Advantageously, this may be obtained by a rigid coupling in the force path, for example by means of gear drive or chain transmission.

The harvesting attachment, which enables the process of the invention to be carried out in an advantageous manner, may be attached individually or in combination to agricultural machines or harvesters. The attachments are driven by the harvester by means of an intermediate gear which also drive the conveyor elements extending in the working direction of the machine. The intake rolls are driven beginning with the intermediate gear, by further intermediate gears. Both of the intake rolls are equipped with shear blades, the number of which is different as a function of the rpm ratio, with the shear blades projecting over the circle of motion of the intake roll circumference. The nature of this projection is immaterial and depends largely on the configuration of the intake roll itself Cylindrical intake rolls may be equipped simply with radially projecting shear blades.

In different arrangements the intake rolls have polygonal cross-sections; the shear blades may comprise extensions of the sides of the polygon whereby they are approximately tangential to the circle of motion of the intake roll circumference. It is apparent that intermediate shapes, for example by the edging of the projecting extended polygon surfaces, are also feasible. The intake rolls rotating in opposing directions are driven by means of an intermediate gear, which in turn, is actively connected with the drive of the harvester. The rpm ratio required by the process may be obtained simply by driving the intake rolls, beginning with the same intermediate drive, at the proper rpm with the aid of intermediate gears. Another possible solution consists of positively connecting one of the intake rolls with the intermediate drive of the harvester by means of an intermediate gear and coupling the two intake rolls together, wherein the different rpm of the other intake roll is obtained by the translation ratio provided by the number of teeth of the tooth gears.

In order to better transfer the shearing forces applied to the stalk being gripped, it is advantageous to sharpen the outer edges of the shear blades in a wedge-like manner. Due to this wedge-like sharpening, the edges of the shear blades penetrate deeper into the stalk, thereby finding the necessary resistance for the transfer of force required for cutting. To insure the accurate positioning of the intake rolls relative to each other, it is advantageous to mount at least one of them in an adjustable manner. Means for rapid adjusting, for example through the tubular drive shaft of the variable intake roll, facilitates these adjustments, which further may be adapted in the field to the given growth conditions of the plants.

In a further advantageous embodiment the axles of the intake rolls, which are approximately parallel to the gathering gap, are spaced differently from the plane of the gathering plates. If this spacing of one of the intake rolls from the plane of the gathering plates is set so that it is larger by at least one thickness of the shearing blades than the spacing of the other intake roll from the plane of the gathering plate, tighter overlapping may be obtained in a simple manner.

In order to avoid impact loading, it is further advantageous if the shearing blades are curved relative to the intake rolls in the longitudinal direction. As the result of this arc shape, the shearing blades are not applied simultaneously over their entire length, so that in the case of several stalks, breaking and cutting take place successively in time, thereby "equalizing" the force required. It is self-evident that the shearing blades must be laid out in keeping with the overlap desired so that the more rapidly moving blade of each cooperating pair of shearing blades advances without interference. The same effect could be obtained by dividing the shearing blades parallel to one generating line of the intake roll into individual segments and locating them offset by a certain angle relative to each other. This arrangement is advantageous if the shearing blades are to overlap approximately by their entire height. The angle between the segments is set advantageously so that following one revolution of the slower intake roll the succession of the uniformly distributed segments begins anew.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
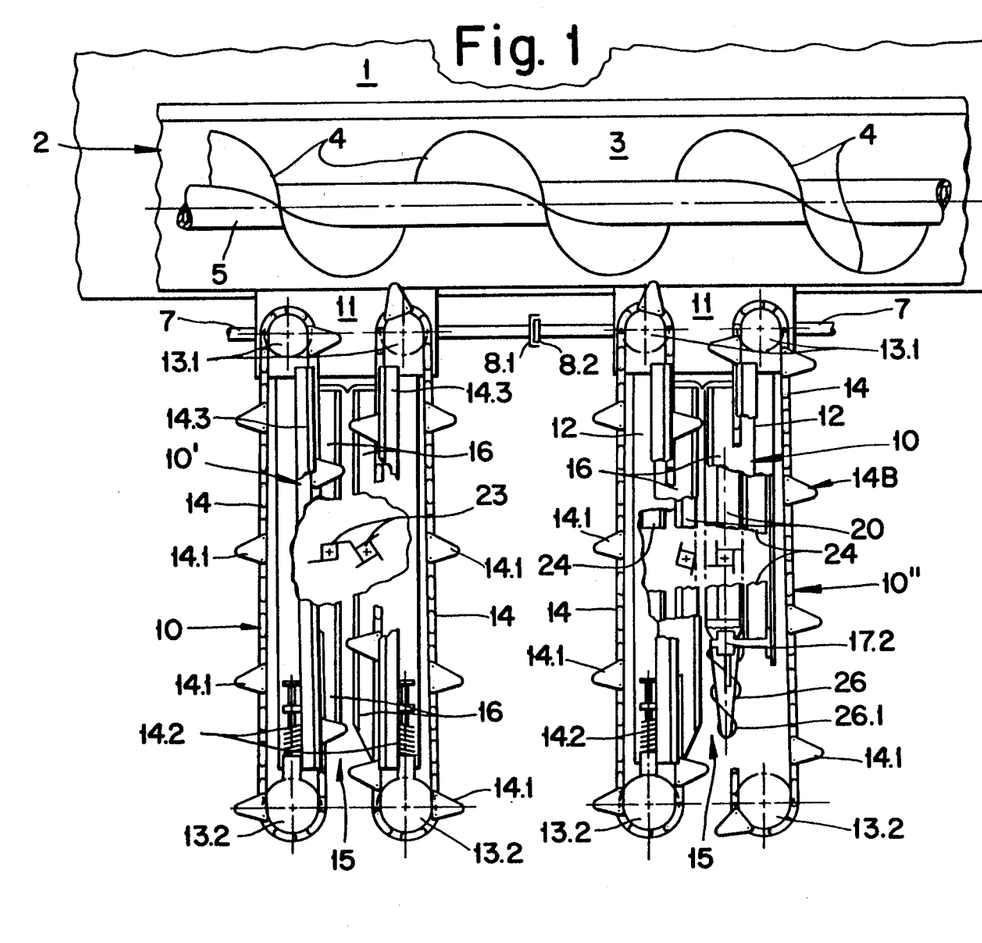
FIG. 1 shows two harvester attachments in plan view attached to portion of a harvester.

FIG. 1 shows two identical harvester attachments 10, designated 10' and 10", mounted on the front side of a harvester 1 (not shown in detail) for harvesting crop clusters of tall growing plants, in particular corn. The harvester attachments are mounted on the front of the harvester 1, so that a longitudinal conveyor 14 provided on each of the attachments empties into a transverse conveyor 2, in which the harvested material is transported by means of a conveyor screw 4 running in the conveyor trough 3 and wound around a screw shaft 5. The conveyor conducts the harvested material laterally into a collector vessel or to another conveyor installation. In the case of harvesters having a central transfer location, the transverse conveyor may contain a long shaft 5 on which are mounted two opposing screws 4 which transport harvested material from both sides to the central transfer location From the drive of the harvester 1, a conventional intermediate drive take-off with a transverse shaft 7 is established, which in turn drives the harvester attachments 10. Since the harvester attachments 10 are replaceable, coupling elements 8.1 and 8.2 are provided to separate the individual segments of the transverse shaft 7 assigned to each of the attachments 10.

The transverse shaft 7 passes through drive gear boxes 11 of the harvester attachments 10, which include intermediate gears as drive elements for driving two intake rolls 20 and two longitudinal conveyors 40 of each of the attachments 10. Extending from the gear box 11 to the front tip end of each harvester attachment are a pair of ground frames 12 which carry, at their front ends, front reversing rolls 13.2 for chain elements 14 which define the longitudinal conveyors. Each chain 14 includes a conveying flight 14A facing the conveying flight 14A of the other chain on opposite sides of a stalk inlet path 15A (see FIG. 5), and a return flight 14B disposed adjacent an outer edge of the attachment 10.

Chain tensioners 14.2 are provided for the tensioning of the chains, by acting on the reversing rolls 13.2. Each chain is guided by a guide rail 14.3 at least on its side facing the stalk inlet path 15A (see FIG. 5). The chain is driven by drive wheels 13.1 which are mounted on rear ends of the frames 12 and actively connected in a known manner with the transverse shaft 7. Carrier cams 14.1 are affixed to the conveyor chain 14 and operate in the stalk inlet path 15A and above a gathering gap 15 to engage crop clusters which have been stripped from the stalks (in a manner to be explained) and transport the clusters to the transverse conveyor 2. In the process, the chain guide rails 14.3 resist lateral outward yielding of the conveying fight of the chain 14, so that the conveying takes place forcibly.

Under the conveying flights 14.1 of the conveyor chains 14, gathering plates 16 are located (see FIG. 5) with the gathering gap 15 defined between opposing edges 16.1 of those plates 16. During the forward motion of the harvester, the plant stalks are drawn through the gathering gap 15 when gripped by intake screws 26.1 mounted on noses 26 of the intake rolls 20. As that occurs, the stalks are transported into the range of portions of the intake rolls 20 equipped with shearing blades 23 (see FIGS. 4, 5).

The shearing blades 23 rotate coaxially with the rolls but are depicted in FIG. 1 as oriented 90° out of their normal plan so as to be more clearly visible in that figure. The intake rolls 20 rotate in rear bearings 17.1 (see FIGS. 2, 3) and in front bearings 17.2 (see FIG. 1), with the rear bearings 17.1 being supported against a wall 11.1 of the drive gear box 11, and the front bearings 17.2 supported against the ground frame 12. In order to keep the shearing blades 22 (FIGS. 4, 5) clean in operation, scrapers 24 are provided on a side facing away from the gathering gap 15 to scrape off plant parts or the like from the shearing blades 23.

Figure 2:
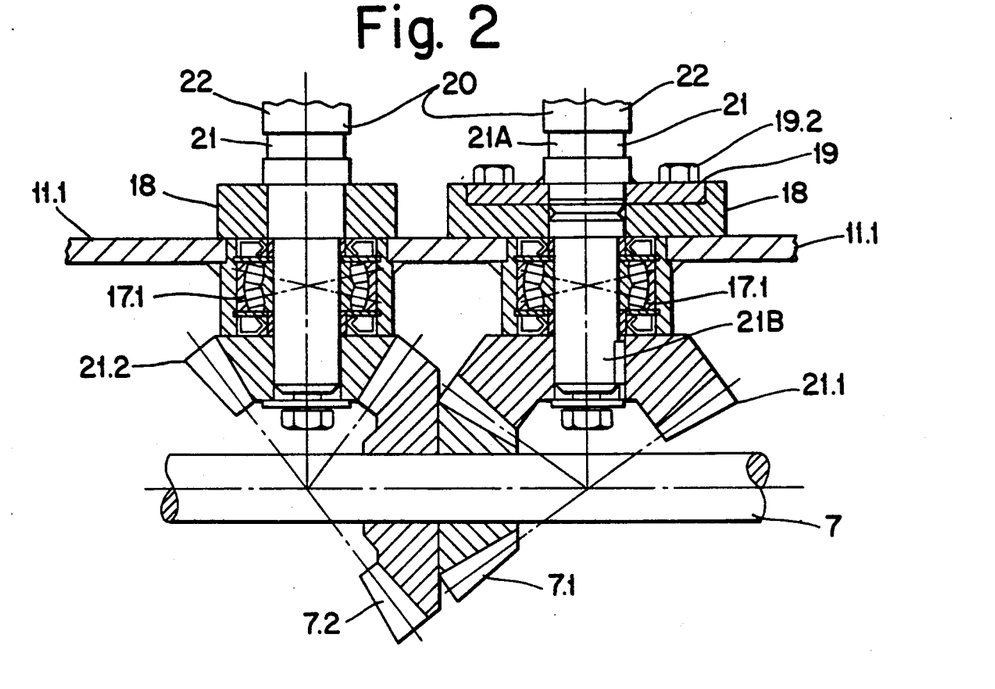
FIG. 2 is a fragmentary longitudinal view of the drive of the rolls.
Figure 3:
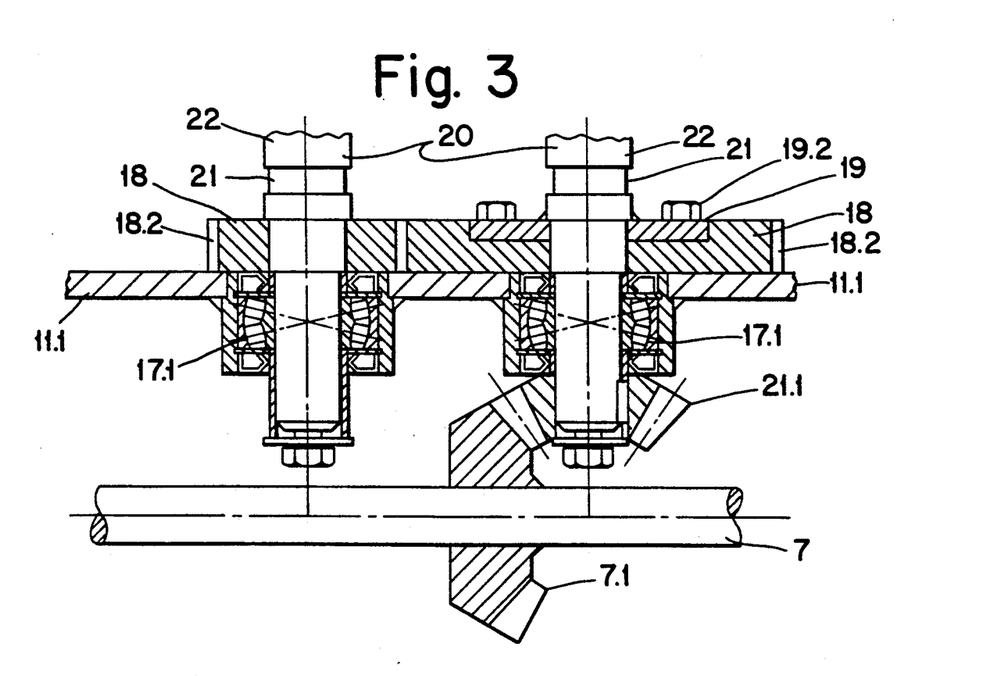
FIG. 3 is a view similar to FIG. 2 of an alternative embodiment.

FIGS. 2 and 3 show two different embodiments of the intake roll drives The intake rolls 20 are shown in the form of intake roll jackets 22 set on intake roll shafts 21, with the shearing blades (not shown for the sake of simplicity).

In the FIG. 2 embodiment, both intake rolls 20 are driven by pairs of bevel wheels, wherein two opposing bevel wheels 7.1 and 7.2 are fixedly connected with the drive shaft 7. Those bevel wheels 7.1 and 7.1 mesh with bevel wheels 21.1 and 21.2 mounted on the rear ends of the intake roll shafts 21. Thus, the shafts 21 rotate in opposite directions from one another. By the appropriate selection of the bevel wheel diameters and the number of gear teeth for the bevel wheels (or a ring gear with a ring of conical teeth), the translation conditions desired may be obtained in a manner such that always one of the shearing blades 23 of one of the intake rolls 20 is cooperating with one of the shearing blades 23 of the other intake roll 20.

The rear ends of the intake roll shafts 21 are mounted in the bearings 17.1 fixedly mounted on the housing, the bearings projecting through the front wall 11.1 of the drive gear box 11 (FIG. 1). At least one of the shafts 21 comprises axially aligned sections 21A, 21B. A shaft flange 18 is provided on the drive shaft portion 21B and is connected thereto by welding or feather keys. The other shaft portion 21A is welded to a base flange 19, which fits into a recess of the shaft flange 18 and is connected with it by means of screws 19.2. The screws 19.2 extend through elongated slots 19.1 provided in the base flange (see FIG. 4), whereby the flange 19 may be rotated relative to the base flange 18 within the limits defined by the length of the elongated holes. Thus, at least one of the intake rolls 20 may be rotated relative to the other for adjustments.

It is apparent that the insertion of the base flange 19 into the shaft flange 18 is not absolutely necessary in order to fasten those flanges together. It is further evident that it is not necessary that both intake rolls 20 be mounted in such an adjustable manner, although by doing so, the number of different components which must be kept on hand is reduced.

The magnitude of the necessary adjusting angle depends on the precision of the manufacturing process and the clearance provided by the intermediate gear, which may increase by wear in operation, so that the adjusting means provided make rotational alignments possible.

In the embodiment according to FIG. 3, one of the intake rolls 20 is driven in the manner described above by the shaft 7 of the intermediate drive through a pair of bevel wheels 7.1 and 21.1. The shaft flange 18 is equipped with toothed rings 18.1 and 18.2 which form meshing spur wheels, whereby the opposite directions of rotation of the shafts are obtained. By a suitable choice of the diameter of the spur wheels or their number of teeth, the required translation ratio is established. Both shafts 21 are supported in the front plate 11.1 of the drive gear box 11 by bearings 17.1 as described above. The intake roll shaft 21 of the intake roll driven by the pair of bevel wheels 17.1 and 21.1 is guided within the shaft flange 18 and fixedly connected with the base flange 19. The base flange 19 is fastened to the shaft flange 18 in the afore-described manner by means of screws 19.1 passing through elongated holes 19.1, so that the base flange 19 (and thus the intake roll 20 associated with it) may be rotated relative to the shaft flange 18. The shaft 21 which is driven by the gear 7.1 is operably connected to the other roll by means of meshing teeth 18.2 on the flange 18 to transmit rotary force thereto. Alternatively, the shaft 21 which is driven by the gear 7.1 could be divided, with one section welded to the shaft flange 18 and the other section welded to the base flange 19. In that case, the drive force from the gear 17.1 to the other shaft would not have to pass through the base flange 19 and the screws 19.2.

Figure 4:
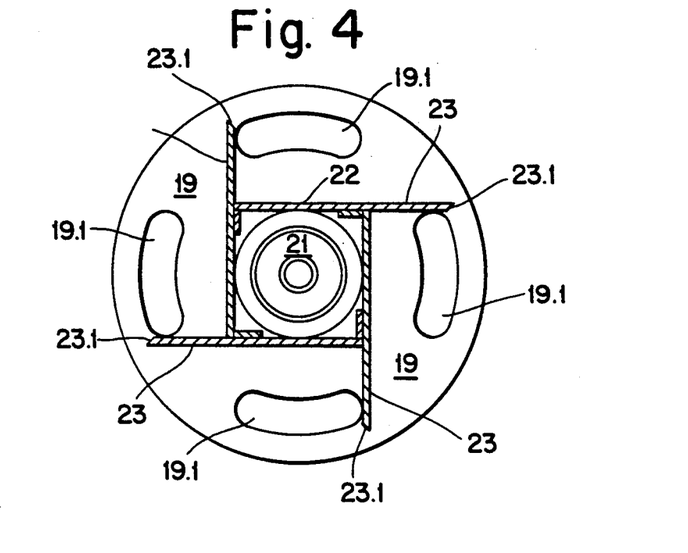
FIG. 4 is a cross-section through an intake roll having a polygonal cross-section and four shearing blades.

FIG. 4 shows a cross-section through an intake roll 20 in the form of a polygonal roll jacket 22. The end of the intake roll is formed by the base flange 19, in which the curved, circular sector shaped elongated holes 19.1 are located for the attachment of the intake roll 20 to the shaft flange 18. The intake roll shaft 21 is disposed within the polygonal (shown here as square) roll jacket 22, with elongated sides of the polygon forming the shearing blades 23. At their free ends the shearing blades 23 are beveled to form wedges 23.1, which do not have sharp edges but rather are blunt.

Figure 5:
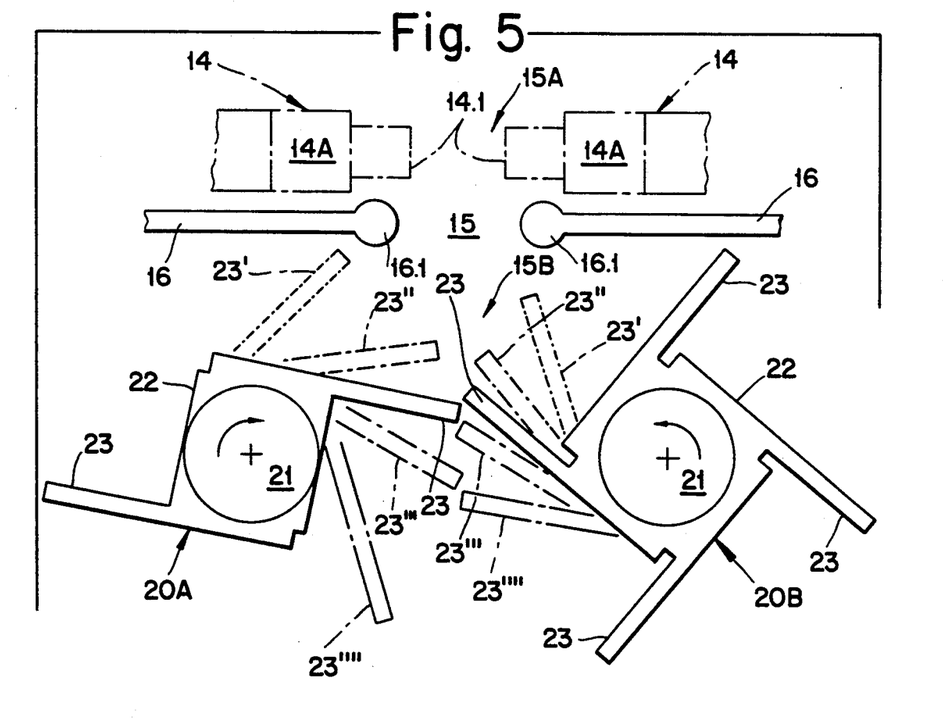
FIG. 5 is a schematic front end view of the cooperating intake rolls of a harvester attachment showing the relative the intake rolls.

Two intake rolls 20A, 20B are shown schematically in FIG. 5 with one of the intake rolls 20B being equipped with four shearing blades 23 and the other intake roll 20A (rotating at twice the speed as roll 20B) equipped with two shearing blades 23 The intake rolls are located under the gather plates 16, the rounded reinforced edges 16.1 of which plates define the edges of the gathering gap 15. The cams 14.1 of the conveyor chains 14 travel above the gathering gap 15, whereby the stripped-off crop clusters are transported to the transverse conveyor 3 (FIG. 1).

In accordance with the present invention, the intake rolls 20 are rotated such that the blades 23 of one intake roll have a tip speed (i.e., the linear speed of the outer edges of the blades) which is greater than the tip speed of the blades of the other intake roll. In FIG. 5, for example, the tip speed of the blades of the intake roll 20A is greater than that of the intake roll 20B. As will be explained, such a relative tip speed of the adjacent blades enables the blades to sever the stalk after initially fracturing the stalk. There are different ways of attaining relative tip speeds between the blades as will be explained hereinafter.

The blades of the two intake rolls 20A, 20B together define a stalk contacting (or nipping) zone 15B disposed in the intake path 15A. The contacting zone 15B includes an inlet disposed proximate the gathering opening 15, and an outlet disposed remote from that opening 15.

In FIG. 5, the movement path is shown schematically as indicated by the rotating arrows (the lengths of the arrows represent the different rotating velocities). Initially, the two shearing blades cooperating with each other are in the position 23' and are moving toward the contacting zone 15B in order to attain after a certain period of time the position 23" and finally the position 23 shown by solid lines where the stalk is fractured. From the position 23", the blade with the faster tip speed (on roll 20A) passes the slower one (on roll 20B) and advances into the positions 23''' and 23'''' in a manner severing the stalk at the point of initial fracture.

As noted earlier, the relative tip speeds can be effected in different ways, taking advantage of the fact that the peripheral speed of a rotating body equals the angular velocity (rpm) multiplied by the radius. Thus, for example, the intake rolls 20A, 20B could be rotated at the same speed and provided with different radii (i.e., the radius from the axis of rotation to the blade tip). Alternatively, the intake rolls could have the same diameter and be rotated at different angular velocities. The intake rolls 20A, 20B can be provided with the same or different numbers of blades, as long as the tip speeds are set so as to achieve the above-described spacial relationship as the opposing blades travel through the contacting zone 15B.

The breaking of or fracturing the stalk prior to shearing or severing reduces the force required to cut the stalk, as the "fracturing work" already applied correspondingly reduces the "shear work" required for comminution. This reduction of the force requirements further leads to a reduction of the overall power needs of the harvesting attachment, which in a final analysis affects the motor power to be installed or the number of attachments possible with a given motor capacity and also makes possible simpler configurations of the drive elements.

It is advantageous further if the rpm ratio of the two intake rolls is an integer number, for example 1:2. This signifies that the faster intake roll has N times the rotating velocity relative to the slower intake roll, preferably twice that velocity, and that the number of its shear blades is 1/N times (preferable ½ times) of that of the slower roll. Simple non-integer ratios, for example 4:6 are also possible, it is merely essential that in the area of the intake path the movements of the shear blades necessarily are related to each other, as described above. Advantageously, this may be obtained by a rigid coupling in the force path, for example by means of gear drive or chain transmission.

Figure 6:
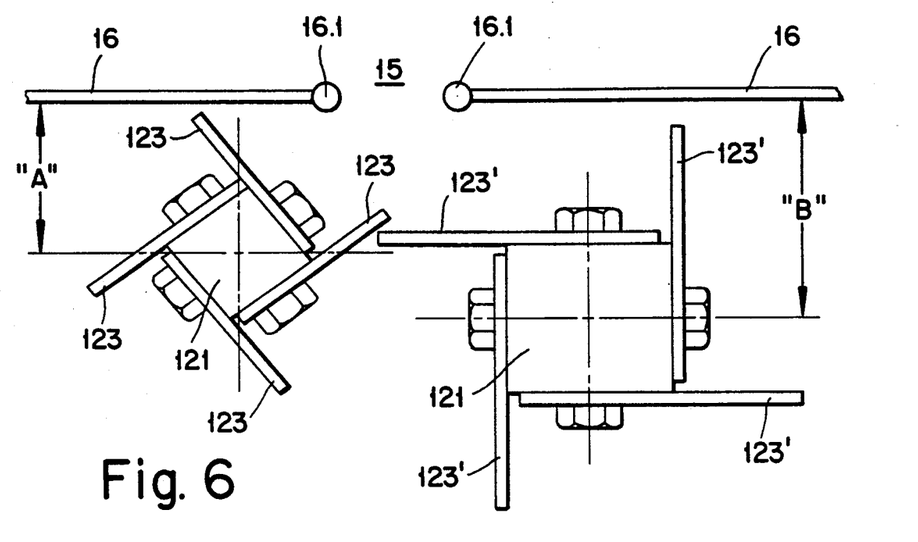
FIG. 6 is a view similar to FIG. 5 of a modified arrangement.
Figure 7:
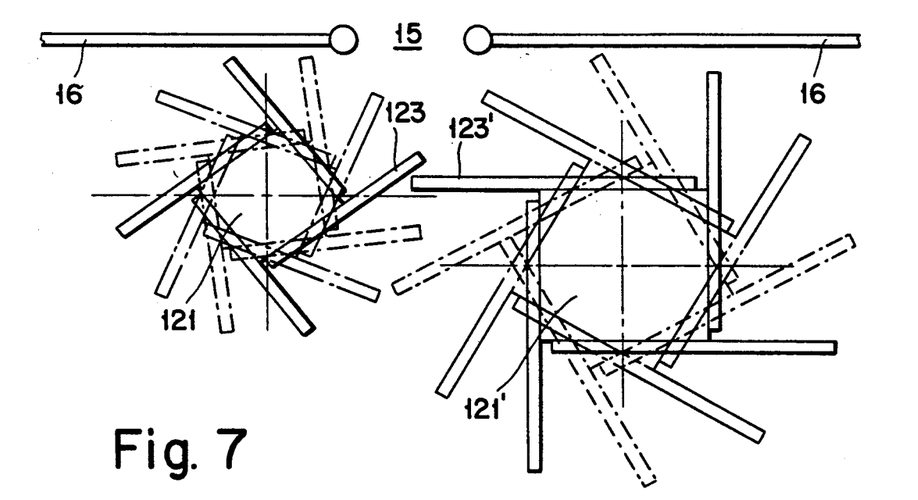
FIG. 7 is a view similar to FIG. 6 showing the travel pattern of the blades.

A further advantageous embodiment involves spacing the axles of the intake rolls (which are approximately parallel to the gathering gap), by different distances from the plane of the gathering plate as depicted in FIGS. 6 and 7. The blades 123, 123' are attached to the intake rolls 121, 121' by mans of bolts. The intake roll 121 is spaced by distance A from its respective plate 16, whereas the other intake roll 121' is spaced by a larger distance B from its respective plate 16. The lengths of the shearing blades 123, 123' are such that those blades slightly overlap radially in the intake path 15A. The tips of the blades 123' are disposed at a greater radius relative to the axis of revolution than the tips of blades 123. This means that at identical angular velocities of the two intake rolls the longer shearing blades 123' will have a higher tangential velocity or tip speed and that therefore the peripheral precision desired is produced by the different diameters. Care must be taken in the set up to ensure that the longer shearing blade 123' enters the intake path prior to the shorter shearing blade 123 and thus be able to leave the intake path ahead of the shorter blade.

If the spacing B of the intake roll 121' from the gathering plate 16 is set so that it is larger than spacing A by at least one thickness of the shearing blades, tighter overlapping may be obtained in a simple manner.

Figure 10:
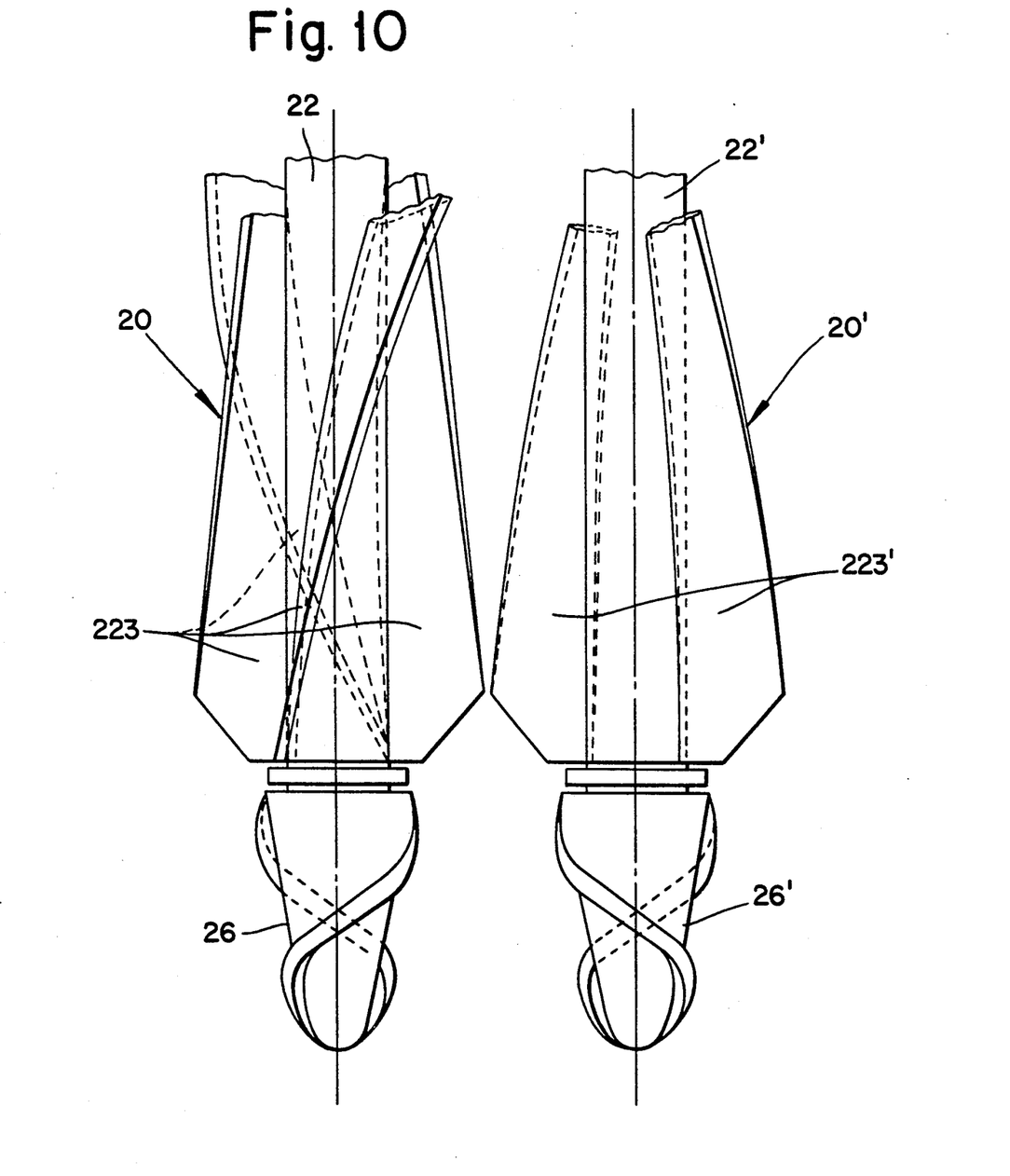
FIG. 10 is a plan view of two modified intake rolls.

Furthermore, although in the depicted embodiment the blades extend linearly in the longitudinal direction (i.e., parallel to the opening 15), it is possible to curve the blades in the longitudinal direction so that each cooperating pair of blades converges progressively from front-to-rear in order to distribute the impact loading as depicted in FIG. 10. FIG. 10 shows two intake rolls 20 and 21' whose shearing blades 223, 223' are set in a curving fashion onto the circumferential surfaces 22 and 22' of the shafts, which are cylindrical. The intake roll 20 has four shearing blades 223 and the intake roll 29' two shearing blades 223', from which it follows that the intake roll 20' must have twice the rpm of the intake roll 20 to ensure that during the passage of one of the shearing blades 223, one of the shearing blades 223' is also passing through.

Figure 8:
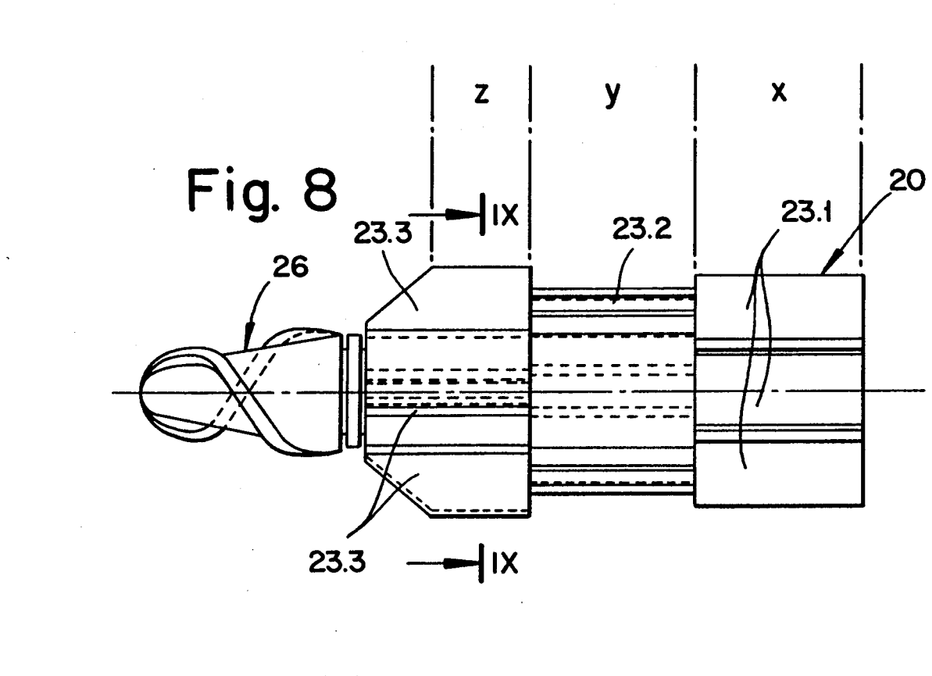
FIG. 8 is a side elevational view of a modified form of intake roll.
Figure 9:
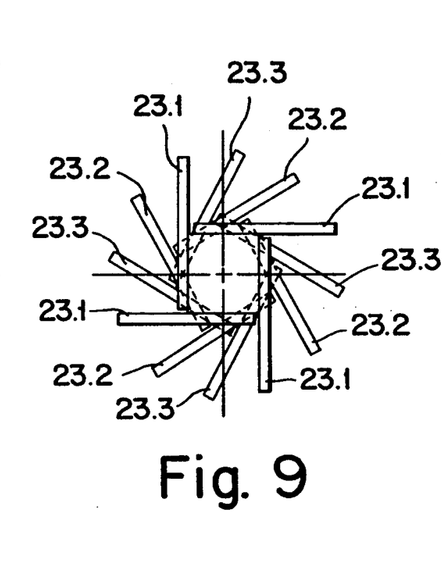
FIG. 9 is an end view of the take roll depicted in FIG. 8.

This same result could also be obtained by dividing the blade 22 into longitudinally spaced segments, with successive segments being circumferentially offset from one another as depicted in FIGS. 8 and 9. Those figures show a single intake roll divided into three segments X, Y and Z. The shearing blades 23.1 (in segment X), 23.2 (in segment Y) and 23.3 (in segment Z) are offset relative to each other by certain angular distances, as shown in FIG. 9. The blades of the other intake roll are divided correspondingly, with the angular distances adding up to a full circle.

Figure 11:
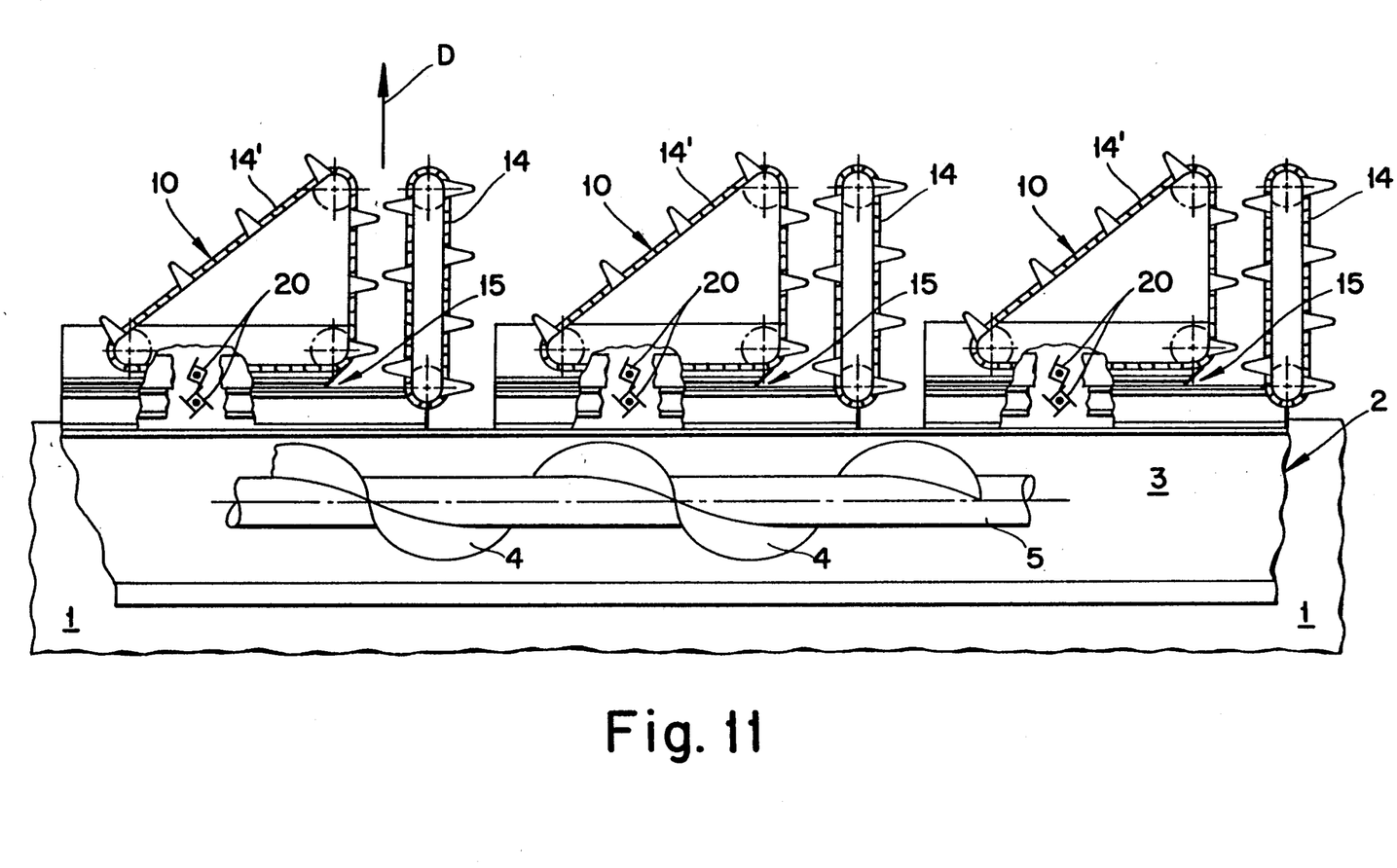
FIG. 11 is a plan view of an alternative arrangement of harvester attachments.

FIG. 11 shows an alternative arrangement of harvester attachments 10 in front of the harvester 1, wherein the transverse conveyor 2 of the harvester is located so that its screw 4 is able to receive the crop clusters gathered by the harvester attachments 10 and drop them into the trough 3 of the transverse conveyor and then transport them to a collector location. While moving through a field, the stalks of plants standing in rows are seized by the conveyor chains 14 and 14' moving in opposing directions and transported to the gathering gap 15, with one conveyor chain 14' being guided over three reversing wheels in a triangle, in a manner such that one side of the triangle is parallel to the gathering gap 15 located at an angle to the direction of motion. The intake rolls 20 here are parallel to the gathering gap 15 and are thus located at the same angle to the direction of motion D.

The harvester attachment may be suitably inclined from the horizontal toward the ground, in particular to be able to harvest plants lying on the ground, for example corn on the ground. The noses 26 of the intake rolls 20 would be located slightly lower than their ends on the drive side. In addition, the inlet path 15A may be oriented relative to the traveling direction of the harvester, so that there is an angle formed between the moving direction and the intake path with the angle amounting to up to 90°.

Although the present invention has been described in connection with preferred embodiments thereof, it will be appreciated by those skilled in the art that additions, deletions, modifications and substitutions not specifically described may be made without departing from the spirit and scope of the invention as defined in the appended claims.

What is claimed is:

1. In a process for harvesting crop clusters of tall plant stalks, wherein said stalks are introduced into a longitudinally extending intake path and are pulled through a gathering gap disposed in said intake path to strip said crop clusters from said stalks, the improvement comprising the steps of:
   providing a pair of bladed rotary members having longitudinally extending axes disposed along opposing sides of said gathering gap,
   rotating said members in opposite directions such that opposing blades of said members define a stalk contacting zone having an inlet situated proximate said gathering gap and an outlet situated remote from said gathering gap, said opposing blades having different tip speeds whereby stalks are fractured and severed by said opposing blades, said opposing blades radially overlapping during travel through said stalk contacting zone.

2. A process according to claim 1, wherein said opposing blades fracture said stalks adjacent said inlet of said stalk contacting zone and then sever said stalks adjacent said outlet of said stalk contacting zone.

3. A process according to claim 1, wherein said bladed members are rotated adjacent rear portions of intake rolls having stalk-engaging screw elements at their front ends.

4. A process according to claim 1, wherein said bladed members have the same diameter and are rotated at different angular speeds.

5. A process according to claim 1, wherein said bladed members have different diameters and are rotated at the same angular speed.

6. A process according to claim 1, wherein said providing step comprises providing the one of said bladed members having a greater tip speed with fewer blades than the other of said bladed members.

7. In a harvester attachment for gathering crop clusters of tall plant stalks including means defining a longitudinally extending stalk intake path in which stalks are received as said attachment is advanced, and means for pulling the stalks through a gathering gap disposed in said intake path to strip crop clusters from the stalks, the improvement comprising:
   a pair of bladed rolls having longitudinally extending axes of rotation disposed along opposite sides of said gathering gap, said rolls arranged such that opposing blades of said rolls define a stalk contacting zone having an inlet situated proximate said gathering gap and an outlet situated remote from said gathering gap, said opposing blades radially overlapping while traveling through said stalk contacting zone, and drive means for rotating said rolls in opposite directions and such that opposing blades have different tip speeds whereby stalks are fractured and severed by said opposing blades.

8. Apparatus according to claim 7, wherein said means for pulling stalks through said gathering gap comprises a pair of helical screw members situated forwardly of said bladed rolls and rotatable about said axes of rotation.

9. Apparatus according to claim 7, wherein said bladed rolls have the same diameter and said drive means rotates said bladed rolls at different angular speeds.

10. Apparatus according to claim 9, wherein the faster of said bladed rolls rotates at a speed which is N times faster than the slower of said bladed rolls, said faster bladed roll having 1/N times the number of blades as said slower bladed roll.

11. Apparatus according to claim 7 including a pair of shafts to which said bladed rolls are connected, said drive means comprising gears connected to said shafts, said gears being configured to rotate one of said shafts faster than the other.

12. Apparatus according to claim 7, wherein said bladed rolls have different diameters and are rotated at the same angular speed.

13. Apparatus according to claim 12, wherein said bladed rolls have the same number of blades.

14. Apparatus according to claim 7, wherein said bladed roll whose blades have a greater tip speed contains fewer blades than the other bladed member.

15. Apparatus according to claim 14, wherein said bladed roll with the fewer number of blades has one-half the number of blades as the other bladed roll.

16. Apparatus according to claim 7, wherein said bladed rolls include rotary shafts, said drive means including gear means connected to at least one of said shafts, at least one of said bladed rolls being rotatable relative to said gear means and the other bladed roll to enable the relative angular positions of said opposing blades to be adjusted.

17. Apparatus according to claim 16, wherein said gear means is connected to only one of said shafts, said shafts including meshing toothed wheels for transmitting rotation from said one shaft to the other.

18. Apparatus according to claim 7 including a pair of gathering plates spaced apart to define said gathering gap, said bladed members being spaced by different distances from said gathering plates.

19. Apparatus according to claim 7, wherein each of said bladed rolls is shaped as a polygon in crosssection, said blades projecting from sides of said polygon.

20. Apparatus according to claim 7, wherein each of said bladed rolls is separated into a plurality of longitudinally adjacent sections arranged in a circumferentially offset manner so that the blade tips of said sections of each bladed roll engage stalks successively.

21. Apparatus according to claim 7, wherein said blade tips extend longitudinally non-parallel to said axes of rotation whereby said blades engage stalks progressively in the longitudinal direction.

22. Apparatus according to claim 21, wherein said blade tips are curved in the longitudinal direction.

23. Apparatus according to claim 7, wherein said bladed rolls are rotatable about mutually parallel axes oriented to extend substantially perpendicular to a direction of advancement of said harvester attachment.--

* * * * *